United States Patent
Chen et al.

(10) Patent No.: US 12,051,180 B2
(45) Date of Patent: Jul. 30, 2024

(54) METHOD FOR GENERATING IMAGES WITH HIGH DYNAMIC RANGE DURING MULTIPLE EXPOSURES AND TIMES OF CAPTURE, DEVICE EMPLOYING METHOD, AND STORAGE MEDIUM

(71) Applicant: Chiun Mai Communication Systems, Inc., New Taipei (TW)

(72) Inventors: Sheng-Yeh Chen, New Taipei (TW); Yung-Yu Chuang, New Taipei (TW); Tzu-Kuei Huang, New Taipei (TW); Nai-Sheng Syu, New Taipei (TW); Yu-Ching Wang, New Taipei (TW); Ting-Hao Chung, New Taipei (TW); Chun-Hsiang Huang, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 640 days.

(21) Appl. No.: 17/243,903

(22) Filed: Apr. 29, 2021

(65) Prior Publication Data
US 2021/0342986 A1   Nov. 4, 2021

(30) Foreign Application Priority Data
Apr. 30, 2020   (TW) ................. 109114661

(51) Int. Cl.
   *G06T 5/92*   (2024.01)
   *G06N 20/00*  (2019.01)
   *G06T 5/50*   (2006.01)

(52) U.S. Cl.
   CPC ............ *G06T 5/92* (2024.01); *G06N 20/00* (2019.01); *G06T 5/50* (2013.01);
   (Continued)

(58) Field of Classification Search
   CPC . G06T 5/009; G06T 5/50; G06T 2207/20081; G06T 2207/20208; G06T 2207/20221; G06N 20/00
   See application file for complete search history.

(56) References Cited

U.S. PATENT DOCUMENTS

| 8,525,900 B2 | 9/2013 | Garten |
| 9,792,518 B2 | 10/2017 | Kavanau |

(Continued)

FOREIGN PATENT DOCUMENTS

| CN | 103067671 | 4/2013 |
| CN | 106506981 | 3/2017 |
| TW | 201804434 | 2/2018 |

OTHER PUBLICATIONS

Chen, Y., Yu, M., Chen, K., Jiang, G., Song, Y., Peng, Z., & Chen, F. (Sep. 2019). New stereo high dynamic range imaging method using generative adversarial networks. In 2019 IEEE International Conference on Image Processing (ICIP) (pp. 3502-3506). IEEE. (Year: 2019).*

(Continued)

*Primary Examiner* — David Perlman
(74) *Attorney, Agent, or Firm* — ScienBiziP, P.C.

(57) ABSTRACT

A method for generating images with high dynamic range (HDR) based on multiple images captured at different aperture values, under different conditions, or at different shutter speeds is applied in a device. The method inputs the original multiple images into a predetermined model and aligns the multiple images. The method further confirms object images that need to be attended among multiple aligned images and obtains a merge weighting for each of the object images, and merges the images for a generated HDR according to the merge weighting of each image. The device utilizing the method is also disclosed.

15 Claims, 2 Drawing Sheets

(52) U.S. Cl.
CPC ............... *G06T 2207/20081* (2013.01); *G06T 2207/20208* (2013.01); *G06T 2207/20221* (2013.01)

(56) References Cited

U.S. PATENT DOCUMENTS

2018/0302544 A1* 10/2018 Dhiman ................. H04N 25/61
2019/0096046 A1* 3/2019 Kalantari ............... G06T 7/337
2020/0265567 A1* 8/2020 Hu .......................... G06T 5/007

OTHER PUBLICATIONS

Yan, Q., Gong, D., Shi, Q., Hengel, A. V. D., Shen, C., Reid, I., & Zhang, Y. (2019). Attention-guided network for ghost-free high dynamic range imaging. In Proceedings of the IEEE/CVF Conference on Computer Vision and Pattern Recognition (pp. 1751-1760). (Year: 2019).*

* cited by examiner

METHOD FOR GENERATING IMAGES WITH HIGH DYNAMIC RANGE DURING MULTIPLE EXPOSURES AND TIMES OF CAPTURE, DEVICE EMPLOYING METHOD, AND STORAGE MEDIUM

FIELD

The subject matter herein generally relates to image processing.

BACKGROUND

When capturing images, the scene may include areas of high-brightness and/or areas of low-brightness, the images when viewed may thus comprise an overly-bright region and/or an overly-dark region. A current solution is to take multiple images and superimpose the multiple images to form a high dynamic range (HDR) image. However, taking multiple images may include hand tremor or other jitter, object movement in the scene, etc., which may cause ghosting in the HDR image.

Thus, there is room for improvement.

BRIEF DESCRIPTION OF THE DRAWINGS

Implementations of the present disclosure will now be described, by way of embodiments, with reference to the attached figures.

DETAILED DESCRIPTION

Figure 1:
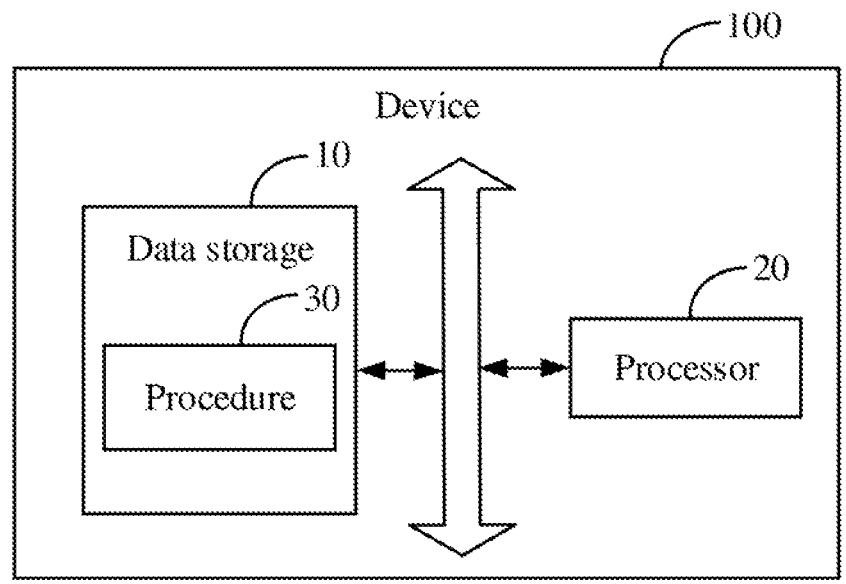
FIG. 1 is a block diagram of an embodiment of a device for generating an HDR image.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

The term "comprising," when utilized, means "including, but not necessarily limited to"; it specifically indicates open-ended inclusion or membership in the so-described combination, group, series, and the like.

FIG. 1 illustrates an embodiment of a device (device 100) for generating an HDR image. The device 100 can comprise at least one data storage 10, at least one processor 20, and carries out a procedure for generating the HDR image (procedure 30). The procedure 30 may be based on a plurality of computerized codes, the plurality of computerized codes may include commands that can be executed by the processor 20.

In one embodiment, the device 100 can be a digital camera, a mobile phone, a tablet personal computer, or the like. The device 100 can further comprise a camera, a display device, and communication buses.

In one embodiment, the data storage 10 can be in the device 100, or can be a separate external memory card, such as an SM card (Smart Media Card), an SD card (Secure Digital Card), or the like. The data storage 10 can include various types of non-transitory computer-readable storage mediums. For example, the data storage 10 can be an internal storage system, such as a flash memory, a random access memory (RAM) for temporary storage of information, and/or a read-only memory (ROM) for permanent storage of information. The data storage 10 can also be an external storage system, such as a hard disk, a storage card, or a data storage medium. The processor 20 can be a central processing unit (CPU), a microprocessor, or other data processor chip that performs functions of the device 100.

Figure 2:
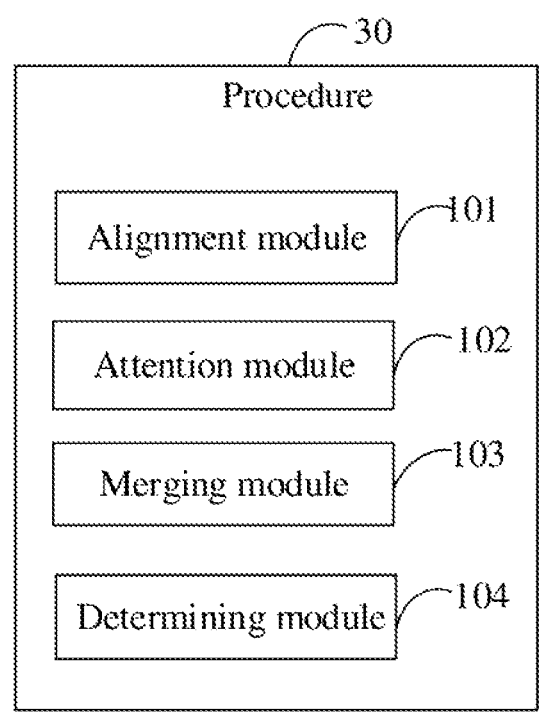
FIG. 2 is a block diagram of an embodiment of a procedure for generating the HDR image, applied in the device of FIG. 1.

FIG. 2 illustrates the procedure 30. The procedure 30 arises from a plurality of modules, such as an alignment module 101, an attention module 102, a merging module 103, and a determining module 104. The modules 101-104 may comprise one or more software programs in the form of computerized codes stored in the data storage 10. The computerized codes may include commands that can be executed by the processor 20 to provide functions for the modules 101-104.

The alignment module 101 inputs a plurality of captured first images of a scene into a predetermined model and aligns the plurality of first images by the predetermined model to obtain a plurality of second images.

In one embodiment, the predetermined model can align the plurality of first images to obtain the plurality of second images, based on a deep learning architecture. The predetermined model can be trained through a supervised learning architecture. For example, the predetermined model can be a homography network that is obtained by training a convolutional neural network (CNN) architecture based on a predetermined sample image dataset. The predetermined sample image dataset can comprise multiple sample images and multiple augmented images. The multiple augmented images can be generated by performing a random perspective transformation on the multiple sample images. The predetermined sample image dataset can be stored in the data storage 10, or other storage devices separate from the device 100.

For example, the predetermined sample image dataset comprises multiple sample image pairs. A first sample image pair comprises four sample images A1-A4, and sample images A2-A4 are obtained by performing a random perspective transformation on the sample image A1. A second sample image pair comprises three sample images B1-B3, and sample images B2-B3 are obtained by performing a random perspective transformation on the sample image B1.

In one embodiment, the sample image pairs of the predetermined sample image dataset can be divided into a training set and a test set. An amount of data of the training set is greater than an amount of data of the test set. For example, there can be eighty percent of the sample image pairs in the training set, and twenty percent of the sample image pairs in the test set. The CNN architecture can be trained through the training set to obtain the predetermined model, test the predetermined model through the test set, and determine whether an image alignment result of the predetermined model meets a first predetermined standard based on a result of testing of each sample image set in the test set. If the image alignment result of the predetermined model meets the first predetermined standard, the predetermined model is deemed equal to the requirements of the model, and the training of the predetermined model is thus completed. If the image alignment result of the predetermined model does not meet the first predetermined standard, training parameters of the CNN architecture can be adjusted, and the CNN architecture with the adjusted training parameters is retrained through the training set to obtain a new predetermined model. The new predetermined model is tested through the test set. If an image alignment result of the new predetermined model still does not meet the first predetermined standard, adjustment steps of model parameters can be repeated until an image alignment result of retrained model meets the first predetermined standard.

In one embodiment, the number of the plurality of first images can be defined according to an actual requirement. For example, the alignment module 101 inputs at least two images of the scene into the predetermined model.

The plurality of first images are image captures of the same scene, and the plurality of first images can be captured at different aperture values or at different shutter speeds. The plurality of first images can be low dynamic range (LDR) images.

When the predetermined model is trained, the alignment module 101 can input the plurality of first images into the predetermined model and align the plurality of first images by the predetermined model.

In one embodiment, the predetermined model can estimate a homography matrix with respect to the plurality of first images, and align the plurality of first images based on the homography matrix.

For example, the alignment module 101 inputs two images with different aperture values which are captured at the same scene into the predetermined model, and the predetermined model can align the two images to output two aligned images. The alignment module 101 inputs two images with different shutter speeds which are captured at the same scene into the predetermined model, and the predetermined model can align the two images to output two aligned images.

The attention module 102 confirms a plurality of third images that need to be attended among the plurality of second images.

For example, the plurality of third images that need to be attended means that images need to be weighted or needs to be given a dynamic weighting.

In one embodiment, the attention module 102 can confirm the plurality of third images that need to be attended among the plurality of second images through the following steps a1-a4. In step a1, performing feature extractions on the plurality of second images to generate a feature map. In step a2, analyzing the feature map to define attention levels of image regions of each of the plurality of second images. In step a3, generating a weighting distribution map according to the attention levels of the image regions of each of the plurality of second images. In step a4, confirming the plurality of third images from the plurality of second images according to the weighting distribution map.

For example, step a1 can input the plurality of second images to a shared encoding layer to extract feature maps. Step a2 can employ the feature maps to define different attention levels of image regions of each inputted images based on a machine learning manner. Step a3 can generate a weighting distribution map with different attention regions based on a result of step a2, and step a4 can locate the plurality of third images within the plurality of second images according to the weighting distribution map.

In one embodiment, the attention module 102 can confirm the attention levels of image regions of the plurality of second images. The attention level can be configured to distinguish between different weightings with respect to image regions of the second image. When different weightings are assigned to the image regions of the second image, it can indicate a degree of association between the image regions and the object or objects belonging to it. The objects can comprise a person, a vehicle, a building, etc., of the second image.

In one embodiment, the CNN architecture can be configured to perform feature extraction on the second images, and the objects can be matched according to a result of the feature extraction. The object can be located in the second image through a result of matching, and a higher attention level of image region is defined according to a location of the object. Then, the inclusion of background noise can be avoided.

In one embodiment, the attention module 102 can further confirm a merge weighting of each third image. The merge weighting can be a weight of image regions that need to be attended in the third image, and the weight of the image regions may specifically represent a fusion proportion of each pixel in the image regions that needs to be attended.

In one embodiment, the attention module 102 can employ a predetermined attention network to confirm the plurality of third images that need to be attended among the plurality of second images, and the merge weightings of the image regions that need to be attended in each third image.

In one embodiment, the attention module 102 can also employ a predetermined merging network to confirm the merge weightings of the image regions that need to be attended in each third image.

In one embodiment, image segmentation can be performed on the image regions that need to be attended in each third image by using a predetermined image segmentation architecture. For example, the image segmentation architecture is U-Net architecture.

In one embodiment, the attention module 102 can define different merge weightings of each third image according to brightness of image regions of each third image. For example, the attention module 102 defines different merge weightings to the plurality of third images according to brightness values of high-brightness regions, or define different merge weightings to the plurality of third images according to brightness values of low-brightness regions.

The merging module 103 merges a generated HDR image according to the merge weighting of each of the plurality of third images.

In one embodiment, when the plurality of third images that need to be attended among the plurality of second images and the merge weightings of the image regions that need to be attended in each third image are both confirmed, the merging module 103 can merge the generated HDR image based on the plurality of third images.

In one embodiment, the merging module 103 can employ the predetermined merging network to merge the generated HDR image based on the plurality of third images. The merging module 103 employing the predetermined merging network to merge the generated HDR image based on the plurality of third images may comprise the following steps b1-b4. In step b1, dividing the image regions that need to be attended in the plurality of third images into multiple image region sets according to region locations of the image regions, each of the multiple image region sets corresponding to one region location. In step b2, confirming merge weighting of each of the image regions of each of the image region sets through the predetermined merging network. In step b3, merging the image regions of the image region set according to the merge weighting of each of the image regions, to obtain an HDR region image corresponding to the image region set. In step b4, synthesizing the multiple HDR region images to obtain the final HDR image (generated HDR image).

For example, the generated HDR image is synthesized based on ten HDR region images P1~P10. An image region set S1 corresponding to the HDR region images P1 comprises three image regions I1, I2, and I3. The merging module 103 can employ the predetermined merging network to confirm merge weightings of the image regions I1~I3, and merge the image regions I1~I3 to obtain the HDR region image P1 according to the merge weightings of the image regions I1~I3.

The determining module 104 determines whether a merging result of the generated HDR image meets a predetermined requirement based on a set of real HDR images and fake HDR images.

In one embodiment, the determining module 104 can input the generated HDR image and determine whether the merging result of the generated HDR image meets the predetermined requirement. The determining module 104 can be established beforehand by comprising the set of real HDR images and fake HDR images, and finding criteria to distinguish real HDR images from the fake ones. When the determining module 104 regards the generated HDR image as a real HDR image, it indicates that the merging result of the generated HDR image meets the predetermined requirement. When the determining module 104 regards the generated HDR image as a fake HDR image, it indicates that the merging result of the generated HDR image does not meet the predetermined requirement.

In one embodiment, the determining module 104 can employ a predetermined discriminative network to determine whether the merging result of a generated HDR image meets the predetermined requirement. When the predetermined discriminative network regards the generated HDR image as the real HDR image, it indicates that the merging result of the generated FOR image meets the predetermined requirement. When the predetermined discriminative network regards the generated HDR image as the fake HDR image, it indicates that the merging result of the generated HDR image does not meet the predetermined requirement.

In one embodiment, the predetermined attention network, the predetermined merging network, and the predetermined discriminative network may form a generative adversarial network (GAN) with attention mechanism. The GAN with attention mechanism can be trained based on a predetermined sample dataset, and training samples of the predetermined sample dataset may comprise multiple image pairs. Each of the multiple image pairs may comprise a real HDR image and multiple images of a scene captured at different aperture values. Each of the multiple image pairs may also comprise a real HDR image and multiple images of a scene captured at different shutter speeds.

When the GAN with attention mechanism is trained, multiple processable images of a scene captured at different aperture values or at different shutter speeds are inputted to the predetermined model, the predetermined model can perform alignment processing on the multiple images to be processed to obtain multiple aligned images. The multiple aligned images are inputted into the GAN with attention mechanism, and the GAN with attention mechanism can output an HDR image corresponding to the multiple images to be processed.

Figure 3:
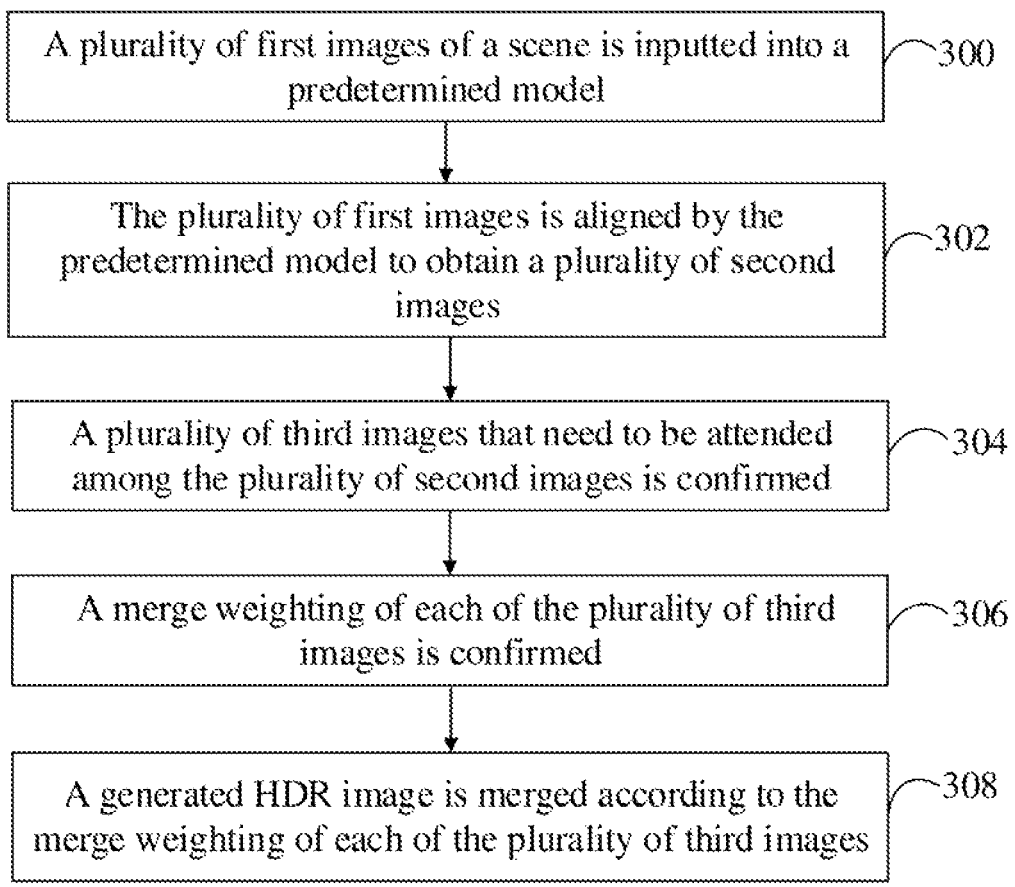
FIG. 3 is a flow diagram of an embodiment of a method for generating the HDR image, applied in the device of FIG. 1.

FIG. 3 illustrates one exemplary embodiment of a method for generating HDR image. The flowchart presents an exemplary embodiment of the method. The exemplary method is provided by way of example, as there are a variety of ways to carry out the method. The method described below can be carried out using the configurations illustrated in FIG. 2, for example, and various elements of these figures are referenced in explaining the example method. Each block shown in FIG. 3 may represent one or more processes, methods, or subroutines, carried out in the example method. Furthermore, the illustrated order of blocks is illustrative only and the order of the blocks can change. Additional blocks can be added or fewer blocks may be utilized, without departing from this disclosure. The example method can begin at block 300.

In block 300, a plurality of first images of a scene is inputted into a predetermined model.

In one embodiment, the predetermined model can align the plurality of first images to obtain the plurality of second images based on a deep learning architecture. The predetermined model can be trained through a supervised learning architecture. For example, the predetermined model can be a homography network that is obtained by training a CNN architecture based on a predetermined sample image dataset. The predetermined sample image dataset can comprise multiple sample images and multiple augmented images. The multiple augmented images can be generated by performing a random perspective transformation on the multiple sample images. The predetermined sample image dataset can be stored in the data storage 10, or other storage devices separate from the device 100.

For example, the predetermined sample image dataset comprises multiple sample image pairs. A first sample image pair comprises four sample images A1-A4, and sample images A2-A4 are obtained by performing a random perspective transformation on the sample image A1. A second sample image pair comprises three sample images B1-B3, and sample images B2-B3 are obtained by performing a random perspective transformation on the sample image B1.

In one embodiment, the sample image pairs of the predetermined sample image dataset can be divided into a training set and a test set. An amount of data of the training set is greater than an amount of data of the test set. For example, there can be eighty percent of the sample image pairs in the training set, and twenty percent of the sample image pairs in the test set. The CNN architecture can be trained through the training set to obtain the predetermined model, test the predetermined model through the test set, and determine whether an image alignment result of the predetermined model meets a first predetermined standard based on a result of testing of each sample image set in the test set. If the image alignment result of the predetermined model meets the first predetermined standard, the predetermined model is deemed equal to the require t of the model, and the training of the predetermined model is thus completed. If the image alignment result of the predetermined model does not meet the first predetermined standard, training parameters of the CNN architecture can be adjusted, and the CNN architecture with the adjusted training parameters is retrained through the training set to obtain a new predetermined model. The new predetermined model is tested through the test set. If an image alignment result of the new predetermined model still does not meet the first predetermined standard, adjustment steps of model parameters can be repeated until an image alignment result of retrained model meets the first predetermined standard.

In one embodiment, the number of the plurality of first images can be defined according to an actual requirement. For example, at least two images of the scene are inputted into the predetermined model.

The plurality of first images are images captures of the same scene, and the plurality of first images can be captured at different aperture values or at different shutter speeds. The plurality of first images can be LDR images.

In block 302, the plurality of first images is aligned by the predetermined model to obtain a plurality of second images.

When the predetermined model is trained, the plurality of first images captured at the same scene is inputted into the predetermined model and the plurality of first images can be aligned by the predetermined model.

In one embodiment, the predetermined model can estimate a homography matrix with respect to the plurality of first images, and align the plurality of first images based on the homography matrix.

For example, two images with different aperture values which are captured at the same scene are inputted into the predetermined model, and the predetermined model can align the two images to output two aligned images. Two images with different shutter speeds which are captured at the same scene are inputted into the predetermined model, and the predetermined model can align the two images to output two aligned images.

In block 304, a plurality of third images that need to be attended among the plurality of second images is confirmed.

For example, the plurality of third images that need to be attended means that images need to be weighted or needs to be given a dynamic weighting.

In one embodiment, the plurality of third images that need to be attended among the plurality of second images can be confirmed through the following steps a1-a4. In step a1, performing feature extractions on the plurality of second images to generate a feature map. In step a2, analyzing the feature map to define attention levels of image regions of each of the plurality of second images. In step a3, generating a weighting distribution map according to the attention levels of the image regions of each of the plurality of second images. In step a4, confirming the plurality of third images from the plurality of second images according to the weighting distribution map.

For example, step a1 can input the plurality of second images to a shared encoding layer to extract feature maps. Step a2 can employ the feature map to define different attention levels of image regions of each inputted images based on a machine learning manner. Step a3 can generate a weighting distribution map with different attention regions based on a result of step a2, and step a4 can locate the plurality of third images within the plurality of second images according to the weighting distribution map.

In one embodiment, the attention levels of image regions of the plurality of second images can be confirmed. The attention level can be configured to distinguish between different weightings with respect to image regions of the second image. When different weightings are assigned to the image regions of the second image, it can indicate a degree of association between the image regions and the object or objects belonging to it. The objects can comprise a person, a vehicle, a building, etc., of the second image.

In one embodiment, the CNN architecture can be configured to perform feature extraction on the second images, and the objects can be matched according to a result of the feature extraction. The object can be located in the second image through a result of matching, and a higher attention level of image region is defined according to a location of the object. Then, the inclusion of background noise can be avoided.

In block 306, a merge weighting of each of the plurality of third images is confirmed.

In one embodiment, the merge weighting can be a weight of image regions that need to be attended in the third image, and the weight of the image regions may specifically represent a fusion proportion of each pixel in the image regions that need to be attended.

In one embodiment, a predetermined attention network can be employed to confirm the plurality of third images that need to be attended among the plurality of second images, and the merge weightings of the image regions that needs to be attended in each of the plurality of third images.

In one embodiment, a predetermined merging network can be employed to confirm the merge weightings of the image regions that need to be attended in each third image.

In one embodiment, image segmentation can be performed on the image regions that need to be attended in each third image by using a predetermined image segmentation architecture. For example, the image segmentation architecture is U-Net architecture.

In one embodiment, different merge weightings of each third image can be defined according to brightness of image regions of each third image. For example, different merge weightings to the plurality of third images can be defined according to brightness values of high-brightness regions, or different merge weightings to the plurality of third images can be defined according to brightness values of low-brightness regions.

In block 308, a generated HDR image is merged according to the merge weighting of each of the plurality of third images.

In one embodiment, when the plurality of third images that need to be attended among the plurality of second images and the merge weightings of the image regions that need to be attended in each of the plurality of third images are both confirmed, the generated HDR image can be merged based on the plurality of third images.

In one embodiment, the predetermined merging network can be employed to merge the generated HDR image based on the plurality of third images. The predetermined merging network merging the generated HDR image based on the plurality of third images may comprises the following steps b1-b4. In step b1, dividing the image regions that need to be attended in the plurality of third images into multiple image region sets according to region locations of the image regions, each of the multiple image region sets corresponding to one region location. In step b2, confirming merge weighting of each of the image regions of each of the image region sets through the predetermined merging network. In step b3, merging the image regions of the image region set according to the merge weighting of each of the image regions, to obtain an HDR region image corresponding to the image region set. In step b4, synthesizing the multiple HDR region images to obtain the final HDR image (generated HDR image).

For example, the generated HDR image is synthesized based on ten HDR region images P1~P10. An image region set S1 corresponding to the HDR region images P1 comprises three image regions I1, I2, and I3. The predetermined merging network can be employed to confirm merge weightings of the image regions I1~I3, and merge the image regions I1~I3 to obtain the HDR region image P1 according to the merge weightings of the image regions I1~I3.

In one embodiment, when the generated HDR image is generated, a merging result of the generated HDR image is determined whether meets a predetermined requirement based on a set of real HDR images and fake HDR images.

In one embodiment, the real HDR images may be prepared beforehand and stored in a first image set, and the first image set can comprise the generated HDR image and one or more real HDR images. When the generated HDR image is regarded as a real FOR image, it indicates that the merging result of the generated HDR image meets the predetermined requirement. When the generated HDR image is regarded as a fake HDR image, it indicates that the merging result of the generated HDR image does not meet the predetermined requirement.

In one embodiment, a predetermined discriminative network can be employed to determine whether the merging result of a generated HDR image meets the predetermined requirement. When the predetermined discriminative network regards the generated HDR image as the real HDR image, it indicates that the merging result of the generated HDR image meets the predetermined requirement. When the predetermined discriminative network regards the generated. HDR image as the fake HDR image, it indicates that the merging result of the generated HDR image does not meet the predetermined requirement.

In one embodiment, the predetermined attention network, the predetermined merging network, and the predetermined discriminative network may form a GAN with attention mechanism. The GAN with attention mechanism can be trained based on a predetermined sample dataset, and training samples of the predetermined sample dataset may comprise multiple image pairs. Each of the multiple image pairs may comprise a real HDR image and multiple images of a scene captured at different aperture values. Each of the multiple image pairs may also comprise a real HDR image and multiple images of a scene captured at different shutter speeds.

The embodiments shown and described above are only examples. Many details known in the field are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. A high dynamic range (HDR) image generating method comprising:
   inputting a plurality of first images of a scene into a predetermined model, wherein the plurality of first images is captured at different aperture values or different shutter speeds;
   aligning the plurality of first images by the predetermined model to obtain a plurality of second images;
   confirming a plurality of third images that need to be attended among the plurality of second images;
   obtaining a merge weighting of each of the plurality of third images; and
   merging a generated HDR image according to the merge weighting of each of the plurality of third images;
   wherein confirming the plurality of third images that need to be attended among the plurality of second images comprises:
   performing feature extractions on the plurality of second images;
   defining attention levels of image regions of each of the plurality of second images according to feature extraction results of the plurality of second images;
   generating a weighting distribution map according to the attention levels of the image regions of each of the plurality of second images; and
   confirming the plurality of third images that need to be attended among the plurality of second images according to the weighting distribution map.

2. The HDR image generating method of claim 1, further comprising:
   determining whether a merging result of the generated HDR image meets a predetermined requirement based on a set of real HDR images and fake HDR images.

3. The HDR image generating method of claim 2, wherein determining whether the merging result of the generated HDR image meets the predetermined requirement based on the set of real HDR images and fake HDR images comprises:
   determining the merging result of the generated HDR image meets the predetermined requirement in response to the generated HDR image being regarded as the real HDR image.

4. The HDR image generating method of claim 1, wherein aligning the plurality of first images by the predetermined model to obtain the plurality of second images comprises:
   aligning the plurality of first images by a deep learning architecture to obtain the plurality of second images.

5. The HDR image generating method of claim 1, wherein obtaining the merge weighting of each of the plurality of third images comprises:
   obtaining the merge weighting of pixels of each of the plurality of third images.

6. The HDR image generating method of claim 1, wherein the predetermined model is trained based on a predetermined sample image dataset, and the predetermined sample image dataset comprises multiple sample images and multiple fourth images that are generated by performing a random perspective transformation on the multiple sample images.

7. The HDR image generating method of claim 1, wherein obtaining the merge weighting of each of the plurality of third images comprises:
   obtaining the merge weighting of each of the plurality of third images according to brightness of image regions of each of the plurality of third images.

8. A high dynamic range (HDR) image generating device comprising:
   at least one processor; and
   a data storage storing one or more programs which when executed by the at least one processor, cause the at least one processor to:
   input a plurality of first images of a scene into a predetermined model, wherein the plurality of first images is captured at different aperture values or different shutter speeds;
   align the plurality of first images by the predetermined model to obtain a plurality of second images;
   confirm a plurality of third images that need to be attended among the plurality of second images;
   obtain a merge weighting of each of the plurality of third images; and merge a generated HDR image according to the merge weighting of each of the plurality of third images;

wherein the at least one processor confirming the plurality of third images that need to be attended among the plurality of second images comprises:

performing feature extractions on the plurality of second images;

defining attention levels of image regions of each of the plurality of second images according to feature extraction results of the plurality of second images;

generating a weighting distribution map according to the attention levels of the image regions of each of the plurality of second images; and confirming the plurality of third images that need to be attended among the plurality of second images according to the weighting distribution map.

9. The HDR image generating device of claim 8, wherein the at least one processor is further configured to:

determine whether a merging result of the generated HDR image meets a predetermined requirement based on a set of real HDR images and fake HDR images.

10. The HDR image generating device of claim 9, wherein the at least one processor determining whether the merging result of the generated HDR image meets the predetermined requirement based on the set of real HDR images and fake HDR images comprises:

determining the merging result of the generated HDR image meets the predetermined requirement in response to the generated HDR image being regarded as the real HDR image.

11. The HDR image generating device of claim 8, wherein the at least one processor aligning the plurality of first images by the predetermined model to obtain the plurality of second images comprises:

aligning the plurality of first images by a deep learning architecture to obtain the plurality of second images.

12. The HDR image generating device of claim 8, wherein the at least one processor obtaining the merge weighting of each of the plurality of third images comprises:

obtaining the merge weighting of pixels of each of the plurality of third images.

13. The HDR image generating device of claim 8, wherein the predetermined model is trained based on a predetermined sample image dataset, and the predetermined sample image dataset comprises multiple sample images and multiple fourth images that are generated by performing a random perspective transformation on the multiple sample images.

14. The HDR image generating device of claim 8, wherein the at least one processor obtaining the merge weighting of each of the third images comprises:

obtaining the merge weighting of each of the plurality of third images according to brightness of image regions of each of the plurality of third images.

15. A non-transitory storage medium having stored thereon instructions that, when executed by a processor of an electronic device, causes the electronic device to perform a high dynamic range (HDR) image generating method, the HDR image generating method comprising:

inputting a plurality of first images of a scene into a predetermined model, wherein the plurality of first images is captured at different aperture values or different shutter speeds;

aligning the plurality of first images by the predetermined model to obtain a plurality of second images;

confirming a plurality of third images that need to be attended among the plurality of second images;

obtaining a merge weighting of each of the plurality of third images; and merging a generated HDR image according to the merge weighting of each of the plurality of third images;

wherein confirming the plurality of third images that need to be attended among the plurality of second images comprises:

performing feature extractions on the plurality of second images;

defining attention levels of image regions of each of the plurality of second images according to feature extraction results of the plurality of second images;

generating a weighting distribution map according to the attention levels of the image regions of each of the plurality of second images; and confirming the plurality of third images that need to be attended among the plurality of second images according to the weighting distribution map.

* * * * *